US009438997B2

(12) United States Patent
Jin et al.

(10) Patent No.: US 9,438,997 B2
(45) Date of Patent: Sep. 6, 2016

(54) DIAPHRAGM, LOUDSPEAKER USING DIAPHRAGM, ELECTRONIC DEVICE AND MOBILE DEVICE USING LOUDSPEAKER, AND METHOD FOR PRODUCING DIAPHRAGM

(71) Applicant: Panasonic Intellectual Property Management Co., Ltd., Osaka (JP)

(72) Inventors: Yohei Jin, Mie (JP); Yoshimichi Kajihara, Mie (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 14/650,324

(22) PCT Filed: Nov. 29, 2013

(86) PCT No.: PCT/JP2013/007018
§ 371 (c)(1),
(2) Date: Jun. 8, 2015

(87) PCT Pub. No.: WO2014/091704
PCT Pub. Date: Jun. 19, 2014

(65) Prior Publication Data

US 2015/0319532 A1 Nov. 5, 2015

(30) Foreign Application Priority Data

Dec. 14, 2012 (JP) ................................ 2012-273169
Dec. 20, 2012 (JP) ................................ 2012-277786

(51) Int. Cl.
*H04R 7/00* (2006.01)
*H04R 7/02* (2006.01)
*H04R 1/00* (2006.01)
*H04R 7/06* (2006.01)
(Continued)

(52) U.S. Cl.
CPC *H04R 7/02* (2013.01); *H04R 1/00* (2013.01); *H04R 7/06* (2013.01); *H04R 31/003* (2013.01);
(Continued)

(58) Field of Classification Search
CPC ................ H04R 7/00; H04R 2207/00; H04R 2307/027; H04R 2307/029
USPC ........................................ 381/423, 426–428
See application file for complete search history.

(56) References Cited

U.S. PATENT DOCUMENTS

2003/0223613 A1* 12/2003 Hachiya ................ H04R 7/125 381/426
2006/0062423 A1* 3/2006 Kawata .................... H04R 7/02 381/426
(Continued)

FOREIGN PATENT DOCUMENTS

JP 51-046930 4/1976
JP 52-055518 5/1977
(Continued)

OTHER PUBLICATIONS

International Search Report of PCT application No. PCT/JP2013/007018 dated Mar. 4, 2014.

*Primary Examiner* — Suhan Ni
(74) *Attorney, Agent, or Firm* — Panasonic IP Management; Kerry S. Culpepper

(57) ABSTRACT

A diaphragm includes a paper layer and a skin layer. The paper layer includes natural fibers and synthetic fibers formed of thermoplastic resin. The paper layer is formed by mixing the natural fibers and the synthetic fibers in water, and thinly spreading a resultant mixture on a mesh. The skin layer is formed on one surface of the paper layer. Note here that the skin layer is formed of the same resin as that of the synthetic fibers.

20 Claims, 10 Drawing Sheets

(51) Int. Cl.
*H04R 31/00* (2006.01)
*H04R 9/06* (2006.01)

(52) U.S. Cl.
CPC ........... *H04R 9/06* (2013.01); *H04R 2307/021* (2013.01); *H04R 2307/023* (2013.01); *H04R 2307/025* (2013.01); *H04R 2307/027* (2013.01); *H04R 2307/029* (2013.01); *H04R 2499/11* (2013.01); *H04R 2499/13* (2013.01); *H04R 2499/15* (2013.01)

(56) References Cited

U.S. PATENT DOCUMENTS

2006/0266577 A1* 11/2006 Inoue ........................ H04R 7/10
181/167
2006/0281381 A1* 12/2006 Fujitani ................... B32B 5/022
442/149
2015/0010197 A1* 1/2015 Kawata .................. H04R 7/125
381/412

FOREIGN PATENT DOCUMENTS

JP 53-005616 1/1978
JP 58-131896 8/1983
JP 2-066097 U 5/1990
JP 2-100395 U 8/1990
JP 6-025118 Y 6/1994
JP 7-284190 10/1995
JP 2011-146769 7/2011

* cited by examiner

DIAPHRAGM, LOUDSPEAKER USING DIAPHRAGM, ELECTRONIC DEVICE AND MOBILE DEVICE USING LOUDSPEAKER, AND METHOD FOR PRODUCING DIAPHRAGM

This application is a U.S. national stage application of the PCT international application No. PCT/JP2013/007018.

TECHNICAL FIELD

The present technical field relates to a loudspeaker used in various audio devices, video devices, and the like; a diaphragm of the loudspeaker; an electronic device and a mobile device using the loudspeaker; and a method for manufacturing the diaphragm.

BACKGROUND ART

A conventional diaphragm is formed of, for example, metal material or an organic resin film. Examples of the metal material include aluminum. Examples of the organic resin film include a polyethylene naphthalate (PEN) film, a polyester (PET) film, and polypropylene foam including a foam layer. Furthermore, a diaphragm having an inorganic membrane on an organic resin film is known.

Note here that information on prior art literatures relating to the invention of the present application includes, for example, PTLs 1, 2, 3, and 4.

CITATION LIST

Patent Literature

PTL 1: Japanese Utility Model Unexamined Publication No. H2-66097

PTL 2: Japanese Utility Model Unexamined Publication No. H2-100395

PTL 3: Japanese Patent Application Unexamined Publication No. S58-131896

PTL 4: Japanese Patent Application Unexamined Publication No. H7-284190

SUMMARY OF THE INVENTION

A diaphragm of the present invention includes a paper layer and a skin layer. The paper layer includes natural fibers and synthetic fibers formed of thermoplastic resin. The skin layer is formed on one surface of the paper layer. The skin layer is formed of the same resin as that of the synthetic fibers.

Since this diaphragm includes natural fibers, it is lighter than a resin diaphragm. Furthermore, since this diaphragm includes synthetic fibers, it has a large internal loss than a paper diaphragm. Furthermore, since this diaphragm includes the skin layer on one surface of the paper layer, rigidity of the diaphragm can be improved. Consequently, a sound pressure level of the diaphragm is improved. Furthermore, a threshold frequency at high frequencies can be extended.

DESCRIPTION OF EMBODIMENTS

Prior to description of an exemplary embodiment, a trend of characteristics required for a loudspeaker mounted to an electronic device is described. A recent electronic device such as an audio device and a video device has been able to reproduce sound with more excellent sound quality by digitalization of a sound source. Therefore, in order to meet the trend, a loudspeaker is required to have a wide reproduction frequency band from a low frequency range to a high frequency range, a wide dynamic range, and low distortion.

For example, a loudspeaker configured to exclusively reproduce high frequencies (hereinafter, referred to as a tweeter) is required to have a high threshold frequency at high frequencies in the reproduction frequency band. Alternatively, also in a loudspeaker reproducing sound in a wide reproduction frequency band from low frequencies to high frequencies (hereinafter, referred to as a full-range loudspeaker), a threshold frequency at high frequencies needs to be high in order to reproduce sound in a wider frequency range. In a loudspeaker, the diaphragm has the largest influence on such characteristics. Therefore, the diaphragm is required to have a high threshold frequency at high frequencies. Thus, the diaphragm to be used for such loudspeakers is required to be light and have high rigidity.

For example, metal material is used in a diaphragm for a tweeter. Since a diaphragm using metal material has high specific gravity, it is difficult to improve a sound pressure level. Also, it is difficult for a diaphragm using metal material to obtain a desired dynamic range. In addition, since a diaphragm using metal material has a low internal loss, so that unnecessary distortion or reverberation occurs.

On the other hand, a diaphragm using resin material has low rigidity. Therefore, it is difficult to improve characteristics of the diaphragm at high frequencies. Thus, when material having high rigidity, for example, a high-function resin film is used as the material of the diaphragm, the diaphragm easily generates sound due to unnecessary vibration, rolling, or the like. Note here that examples of the high function resin film to be used for the diaphragm include engineering plastic.

The diaphragm of this exemplary embodiment solves the above-mentioned problems, and particularly has a high sound pressure level and a high threshold frequency at high frequencies. As a result, a loudspeaker can reproduce sound having excellent sound quality.

Figure 1:
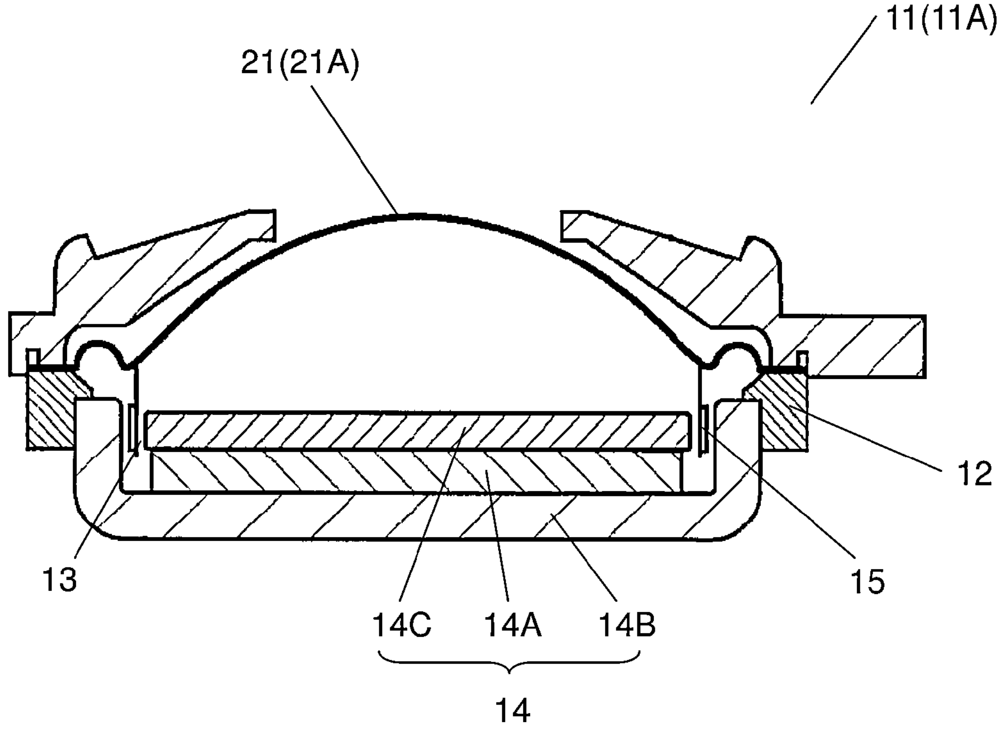
FIG. 1 is a sectional view of a loudspeaker in accordance with an exemplary embodiment of the present invention.
Figure 2:
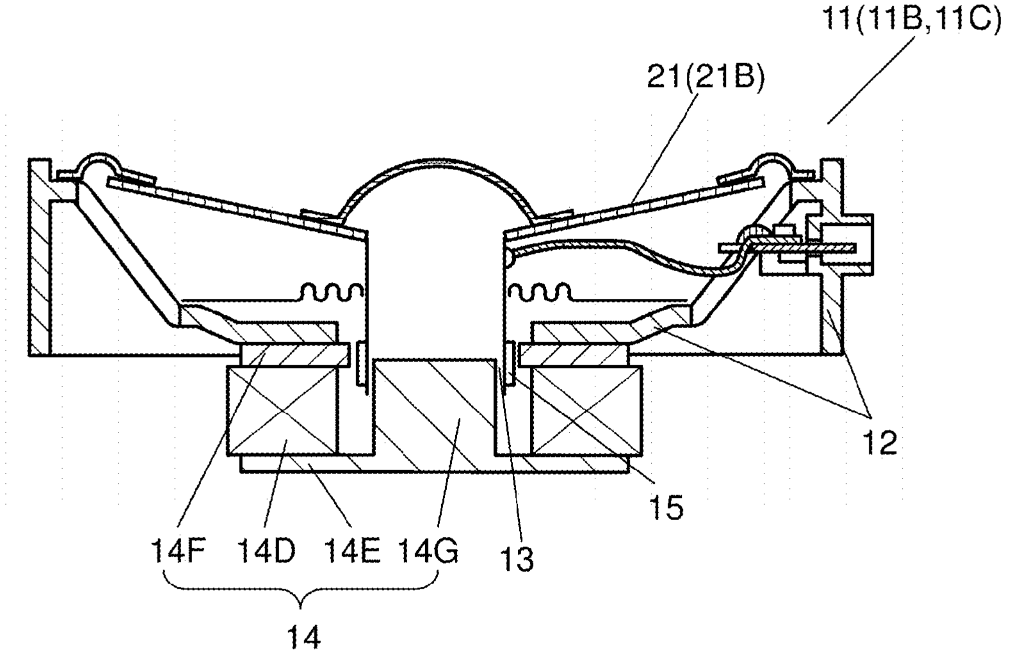
FIG. 2 is a sectional view of another loudspeaker in accordance with the exemplary embodiment of the present invention.

Hereinafter, a loudspeaker of this exemplary embodiment is described with reference to FIGS. 1 and 2. FIG. 1 is a sectional view of a loudspeaker of this exemplary embodiment, and FIG. 2 is a sectional view of another loudspeaker of this exemplary embodiment. Loudspeaker 11 includes frame 12, magnetic circuit 14 provided with magnetic gap 13, voice coil 15, and diaphragm 21.

Magnetic circuit 14 is bonded to frame 12. It is preferable that magnetic circuit 14 is bonded to a middle portion of a back-surface side of frame 12. Alternatively, magnetic circuit 14 may be housed in frame 12.

Note here that it is preferable that magnetic circuit 14 is an inner magnet type. In this case, magnetic circuit 14 includes magnet 14A, yoke 14B, and plate 14C as shown in FIG. 1. Magnet 14A is sandwiched between yoke 14B and plate 14C. Note here that yoke 14B has a lateral wall having an inner surface confronting a lateral surface of plate 14C. Then, magnetic gap 13 is formed between the lateral surface of plate 14C and the inner surface of yoke 14B.

Magnetic circuit 14 is not limited to the inner magnet type but may be an outer magnet type. In this case, magnetic circuit 14 includes magnet 14D, yoke 14E, and plate 14F as shown in FIG. 2. Note here that yoke 14E includes center pole 14G in a middle portion thereof. Magnet 14D is sandwiched between yoke 14E and plate 14F. Note here that a lateral surface of plate 14F confronts the outer peripheral surface of center pole 14G. Magnetic gap 13 is formed between the lateral surface of plate 14F and the outer peripheral surface of center pole 14G.

Furthermore, magnetic circuit 14 may be a type combining the inner magnet type and the outer magnet type.

Voice coil 15 has a first end and a second end. The first end is bonded to diaphragm 21. On the other hand, the second end is inserted into magnetic gap 13.

A periphery of diaphragm 21 is coupled to a periphery of frame 12. Diaphragm 21 may be dome-shaped diaphragm 21A shown in FIG. 1 or cone-shaped diaphragm 21B shown in FIG. 2. Note here that dome-shaped diaphragm 21A has a dome-shaped protrusion as shown in FIG. 1. The protrusion protrudes toward a front-surface direction of dome-shaped diaphragm 21A. Dome-shaped diaphragm 21A is disposed such that the dome-shaped protrusion is located toward the front-surface of loudspeaker 11. On the other hand, cone-shaped diaphragm 21B has a bugle shape opening at the front side as shown in FIG. 2.

Figure 3:
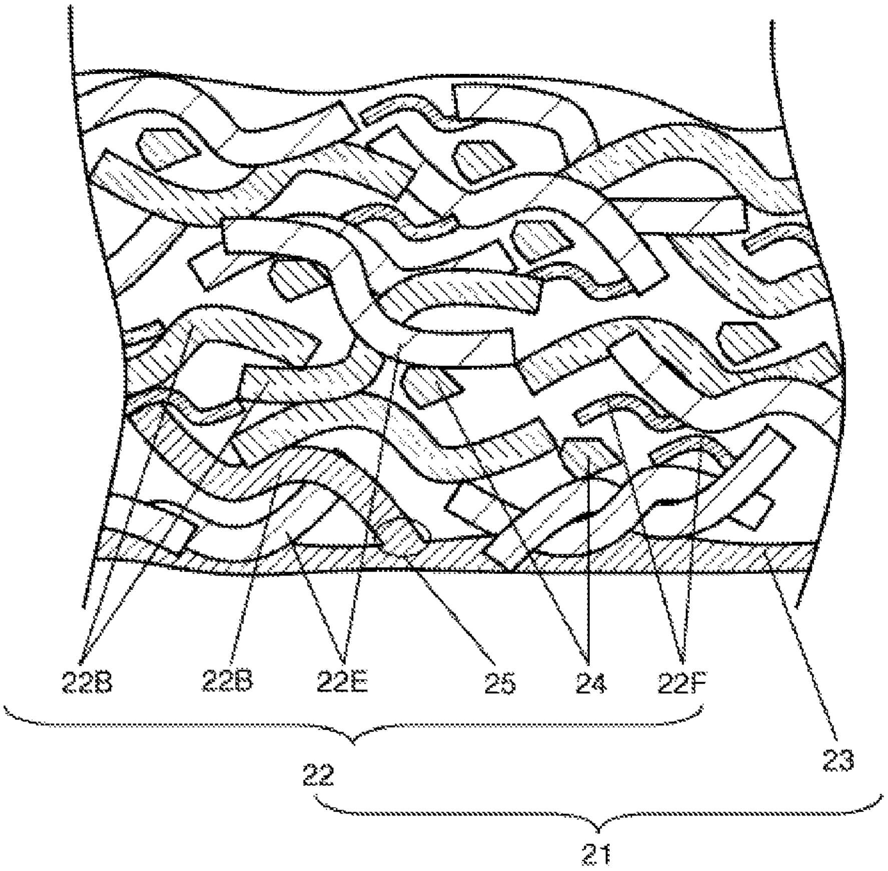
FIG. 3 is a schematic view of a diaphragm of the exemplary embodiment of the present invention.

Next, diaphragm 21 is described with reference to FIG. 3. FIG. 3 is a schematic view of diaphragm 21. Diaphragm 21 includes paper layer 22 and skin layer 23. Paper layer 22 includes natural fibers 22A and synthetic fibers 22C. Synthetic fibers 22C is formed of thermoplastic resin 22B.

Paper layer 22 is produced by using a mesh for papermaking (hereinafter, referred to as a papermaking mesh). Note here that the shape of the papermaking mesh mimics the shape of diaphragm 21. A precursor of diaphragm 21 is produced by dehydrating a mixture, in which natural fibers 22A and synthetic fibers 22C are uniformly mixed in water, by using the papermaking mesh. That is to say, the precursor of diaphragm 21 can be produced by depositing natural fibers 22A and synthetic fibers 22C on the papermaking mesh (hereinafter, referred to as papermaking). The precursor of diaphragm 21 is then dried and pressed, and thereby diaphragm 21 can be manufactured. Note here that a manufacturing method of paper layer 22 is described later in detail.

As mentioned above, since diaphragm 21 includes natural fibers 22A, it is lighter than a resin diaphragm. Furthermore, since diaphragm 21 includes synthetic fibers, it has a larger internal loss than a paper diaphragm. Therefore, diaphragm 21 can suppress occurrence of peaks and dips. As a result, frequency characteristics of diaphragm 21 become flat and stable.

Furthermore, since skin layer 23 is formed on one surface of paper layer 22, rigidity of diaphragm 21 can be improved. Therefore, diaphragm 21 has a high sound pressure level. Furthermore, piston motion of diaphragm 21 is smooth particularly at high frequencies. As a result, a threshold frequency at high frequencies of diaphragm 21 can be extended. Furthermore, since diaphragm 21 includes natural fibers 22A, clear and natural sound can be reproduced.

Next, natural fiber 22A is described. It is desirable that the content ratio of natural fibers 22A to the total weight of diaphragm 21 be 1% by weight or more and 90% by weight or less. When the content of natural fibers 22A in diaphragm 21 is less than 1% by weight, the rigidity of diaphragm 21 is lowered. Therefore, diaphragm 21 cannot reproduce powerful sound. On the other hand, when the content of natural fibers 22A is more than 90% by weight, pinholes are increased in diaphragm 21. Therefore, sound pressure of diaphragm 21 is lowered. Furthermore, distortion of diaphragm 21 is increased.

It is desirable that natural fibers 22A have a beating degree in Canadian Standard Freeness (hereinafter, referred to as a beating degree) of 200 ml or more and 700 ml or less. With this configuration, natural fibers 22A work as a framework of diaphragm 21. Therefore, the rigidity of diaphragm 21 is increased. Furthermore, uneven dispersion of natural fibers 22A in water in papermaking can be suppressed. Therefore, uneven distribution of material in diaphragm 21 can be suppressed.

Furthermore, since natural fibers 22A having the beating degree of 200 ml or more are used, freeness speed in papermaking is high. Therefore, productivity of diaphragm 21 is improved. Furthermore, since natural fibers 22A having the beating degree of 700 ml or less are used, natural fibers 22A are entangled with each other. Therefore, the rigidity of diaphragm 21 is improved. Note here that natural fibers 22A can be beaten by a disk refiner, a beater, or the like.

It is desirable that a length of natural fiber 22A be 0.8 mm or more and 3 mm or less. When the length of natural fiber 22A is less than 0.8 mm or less, strength of natural fiber 22A is inferior to the original strength of the raw material. Therefore, the rigidity of the diaphragm is reduced. On the other hand, the length of natural fiber 22A is more than 3 mm, natural fibers 22A are entangled with each other excessively in mixing. Therefore, the dispersibility of natural fibers 22A in papermaking is reduced.

Thus, setting the length of natural fiber 22A to be in a range of 0.8 mm or more and 3 mm or less makes it possible to suppress a loss of the strength of natural fiber 22A itself. Therefore the rigidity of diaphragm 21 can be increased. Furthermore, uneven dispersion of natural fibers 22A in water in papermaking can be suppressed. Therefore, uneven distribution of natural fibers 22A in diaphragm 21 can be suppressed. Furthermore, defective appearance of diaphragm 21 can be suppressed.

Next, raw material to be used for natural fiber 22A is described. As the raw material of natural fiber 22A, wood material or non-wood material can be used. Examples of the raw material of wood fibers include woods such as conifer or hardwood. On the other hand, examples of the raw material of non-wood fibers include bamboo, bamboo grass, kenaf, jute, bagasse, Manila hemp, gampi, and the like. Alternatively, a mixture of two or more of them may be used. Use of appropriately one or a mixture of two or more of them enables characteristics and sound quality of diaphragm 21 to be adjusted to desired values.

For example, when wood material is used as the raw material of diaphragm 21, the internal loss of diaphragm 21 can be made high as compared with a case where metal material is used. Therefore, an excessive response of diaphragm 21 can be reduced as compared with a case where metal material or the like is used, resulting in that reverberation sound can be suppressed.

On the other hand, when non-wood material is used as the raw material of diaphragm 21, depletion of wood resource can be suppressed. Among the non-wood material, bamboo grows early. Therefore, use of bamboo fibers 22E can suppress acceleration of environmental destruction. Bamboo fibers 22E are continuously available. Furthermore, disposal of diaphragm 21 using bamboo fibers 22E does not require disposal by landfill which is required for disposal of inorganic matters such as a glass fiber. That is to say, since bamboo fibers 22E can be disposed of by incineration, global environment destruction can be controlled.

In general, bamboo grows in about 50 days after its birth. Thereafter, characteristics of the raw material are stable. In particular, characteristics of bamboo about one year or more after its birth are stable. That is to say, characteristics of diaphragm 21 using bamboo fibers 22E obtained from bamboo less than one year after its birth are inferior to characteristics of diaphragm 21 using bamboo fibers 22E obtained from bamboo about one year or more after its birth. Although bamboo grows early, but there is an anxiety that the ecosystem of bamboo is disturbed if bamboos less than one year after its birth are continued to be cut down. Thus, when bamboo fibers 22E are used as natural fibers 22A, it is desirable that bamboo fibers 22E obtained from bamboos whose age is one or more be used.

Bamboo fiber 22E includes lignin. When the content of lignin is more than 20% by weight with respect to the total weight of bamboo fiber 22E, the surface of bamboo fiber 22E includes excessive lignin. The excessive lignin inhibits adhesion of bamboo fibers 22E by a hydrogen bond, resulting in shortage of strength of diaphragm 21.

Thus, it is desirable that the content rate of lignin be 0% by weight or more and 20% by weight or less with respect to the total weight of bamboo fiber 22E. With this configuration, the strength of diaphragm 21 can be improved, and the internal loss can be improved. Note here that the further preferable content rate of lignin is 0% by weight or more and 5% by weight or less with respect to the total weight of bamboo fiber 22E. With this configuration, the strength of diaphragm 21 can be further improved.

When bamboo fiber 22E is used as natural fiber 22A, it is desirable that natural fiber 22A contain microfibrillated bamboo fiber (hereinafter, referred to as micronized bamboo fiber 22F) complementarily. The value of the beating degree of micronized bamboo fiber 22F is smaller than that of bamboo fiber 22E. The beating degree of micronized bamboo fiber 22F is preferably 1 ml or more and 200 ml or less. Micronized bamboo fiber 22F having the beating degree of 200 ml or less is rigid. Therefore, diaphragm 21 including micronized bamboo fiber 22F having the beating degree of 200 ml or less has large rigidity. Furthermore, generation of pinholes in diaphragm 21 can be further suppressed. Furthermore, when micronized bamboo fiber 22F having the beating degree of less than 1 ml is used for diaphragm 21, it takes a long time to carry out papermaking of diaphragm 21. Therefore, it is preferable to use micronized bamboo fiber 22F having the beating degree of 1 ml or more. This configuration brings excellent productivity of diaphragm 21.

Contribution of micronized bamboo fibers 22F, having a content of less than 1% by weight, to the improvement of the rigidity of diaphragm 21 is small. On the other hand, when more than 30% by weight of micronized bamboo fibers 22F are included, micronized bamboo fibers 22F nonuniformly disperse in water in papermaking. As a result, variation of the rigidity occurs depending on places in diaphragm 21. Furthermore, the appearance of diaphragm 21 is deteriorated. Furthermore, since man-hour for producing micronized bamboo fibers 22F is increased, man-hour for manufacturing diaphragm 21 is also increased. Furthermore, addition of micronized bamboo fibers 22F reduces the papermaking speed in papermaking. Therefore, since the man-hour for producing diaphragm 21 is increased, the production cost of diaphragm 21 is remarkably increased.

Thus, it is desirable that the content of micronized bamboo fibers 22F be 1% by weight or more and 30% by weight or less with respect to the total weight of diaphragm 21. With this configuration, micronized bamboo fibers 22F work as a binder for linking bamboo fibers 22E together. Therefore, micronized bamboo fibers 22F further improve the rigidity of diaphragm 21. Furthermore, micronized bamboo fiber 22F suppresses generation of pinholes of diaphragm 21. Therefore, the sound pressure level of diaphragm 21 is improved. Furthermore, a length of micronized bamboo fiber 22F is preferably 0.1 mm or more and less than 0.8 mm. This configuration can improve the rigidity of diaphragm 21.

Next, synthetic fiber 22C is described. Examples of material of synthetic fiber 22C include polyester, polyethylene, acrylic material, vinylon, rayon, and nylon. As the material of synthetic fiber 22C, one of them or a mixture of two or more of them may be appropriately used. This configuration enables characteristics of diaphragm 21 to be set at desired values.

Note here that when polyester resin is used as the material of synthetic fiber 22C, PET, PEN, polylactic acid, and the like, can be used.

When PET is used, occurrence of inconsistencies in synthetic fibers 22C in papermaking can be suppressed. Generation of pinholes of diaphragm 21 can be also suppressed. Therefore, leakage of air of diaphragm 21 can be suppressed. As a result, the distortion of diaphragm 21 can be reduced. Furthermore, since the rigidity of natural fiber 22A can be improved, the reproduction frequency band of diaphragm 21 can be extended.

Use of PEN as the material of synthetic fiber 22C improves both the rigidity and the internal loss of diaphragm 21. Use of polylactic acid as the material of synthetic fiber 22C can contribute to suppressing depletion of fossil fuel and destruction of the global environment.

As the material of synthetic fiber 22C, polyethylene or acrylic may be used. In this case, the internal loss of diaphragm 21 can be improved. Accordingly, unnecessary distortion of the diaphragm can be reduced.

Use of vinylon as the material of synthetic fiber 22C improves the rigidity of diaphragm 21. Consequently, sound with excellent sound quality can be reproduced by diaphragm 21.

As the material of synthetic fiber 22C, rayon or nylon may be used. In this case, heat resistance of diaphragm 21 can be improved. Consequently, the reliability of diaphragm 21 can be improved.

It is preferable to use beaten synthetic fibers 22C for diaphragm 21. Since beating enables a surface area of synthetic fiber 22C to be increased, entanglement of synthetic fibers 22C is increased. Therefore, the rigidity of diaphragm 21 can be strengthened.

It is preferable that diaphragm 21 further includes reinforcement material 24. Examples of reinforcement material 24 include a filling agent, a filler, an inorganic fiber, a water-proofing agent, and pigment. Alternatively, two or more types of reinforcement material 24 may be mixed and blended together. This configuration enables the characteristics of diaphragm 21 to be adjusted to desired values.

Examples of reinforcement material 24 may include aramid fibers, glass fibers, carbon fibers, calcium carbonate, diatomaceous earth, talc, aluminum hydroxide, and carbonized natural fibers. Alternatively, a mixture of two or more of them may be added.

When aramid fibers or glass fibers are used as reinforcement material 24, an elastic modulus or a rigidity limit of diaphragm 21 is improved. In particular, when glass fibers or carbon fibers are used as reinforcement material 24, it is desirable that the content of the glass fibers or the carbon fibers be 1% by weight or more and 50% by weight or less with respect to the total weight of diaphragm 21. When the content of the glass fiber or the carbon fiber is less than 1% by weight, the elastic modulus of diaphragm 21 cannot reach a desired value. When the content of the glass fibers or the carbon fibers is more than 50% by weight, uneven distribution of reinforcement material 24 in diaphragm 21 occurs. Consequently, the appearance of diaphragm 21 is deteriorated. In addition, since the specific gravity of the material is large, the weight of diaphragm 21 becomes heavy. Thus, when the content of the glass fibers or the carbon fibers is 1% by weight or more and 50% by weight or less with respect to the total weight of diaphragm 21, the elastic modulus and the elasticity limit of diaphragm 21 are improved.

Use of calcium carbonate as reinforcement material 24 improves incombustibility of diaphragm 21. Furthermore, generation of pinholes in diaphragm 21 can be suppressed. In addition, the characteristics of diaphragm 21 in high frequencies are excellent.

Note here that it is desirable that the content of calcium carbonate or diatomaceous earth be 1% by weight or more and 30% by weight or less with respect to the total weight of diaphragm 21. The elastic modulus of diaphragm 21 including less than 1% of calcium carbonate cannot reach a desired value. Furthermore, in diaphragm 21 including more than 30% by weight of calcium carbonate, uneven dispersion of reinforcement material 24 occurs. Therefore, uneven distribution of reinforcement material 24 in diaphragm 21 occurs. As a result, the appearance of diaphragm 21 is deteriorated. In addition, since specific gravity of the material is large, the weight of diaphragm 21 becomes heavy.

Note here that when talc is used as reinforcement material 24, it is desirable that the addition amount of talc be 1% by weight or more and 30% by weight or less with respect to the total weight of diaphragm 21. Improvement of the elastic modulus of diaphragm 21 including less than 1% by weight of talc is suppressed. Furthermore, in diaphragm 21 including more than 30% by weight of talc, inconsistent distribution of talc occurs. Consequently, the appearance of diaphragm 21 is deteriorated. In addition, since specific gravity of talc is large, the weight of diaphragm 21 becomes heavy.

Furthermore, when aluminum hydroxide is used as reinforcement material 24, it is desirable that an addition amount of aluminum hydroxide be 30% by weight or more and 70% by weight or less with respect to the total weight of diaphragm 21. This configuration enables the characteristics of diaphragm 21 to be adjusted to desired values. In diaphragm 21 including more than 70% by weight of aluminum hydroxide, inconsistent distribution of aluminum hydroxide occurs. Consequently, the appearance of diaphragm 21 is deteriorated. In addition, since the specific gravity of the material is large, the weight of the diaphragm becomes heavy.

Furthermore, when carbonized natural fibers are used as reinforcement material 24, the elastic modulus of diaphragm 21 and the elasticity limit are improved.

It is preferable that natural fiber 22A, synthetic fiber 22C, reinforcement material 24, and the like, are appropriately selected from the above-mentioned material, for setting the density of diaphragm 21 to a range from 0.25 g/cm$^3$ or more and 1.00 g/cm$^3$ or less. With this configuration, diaphragm 21 is soft and light. In other words, when the density of diaphragm 21 is less than 0.25 g/cm$^3$, the strength of diaphragm 21 is remarkably reduced. Therefore, due to shortage in strength of diaphragm 21, unusual sound is generated from diaphragm 21 particularly in high frequencies. Furthermore, the density of diaphragm 21 is more than 1.00 g/cm$^3$, the density of diaphragm 21 is substantially equal to that of a resin diaphragm. Therefore, the weight of diaphragm 21 is not so different from the resin diaphragm. As a result, the sound pressure of diaphragm 21 is reduced.

Next, skin layer 23 is described. Skin layer 23 is formed on one surface of paper layer 22. Note here that it is preferable that synthetic fibers 22C located in the vicinity of the interface between paper layer 22 and skin layer 23 include fused connecting portion 25. That is to say, it is preferable that a part of synthetic fibers 22C includes fused connecting portion 25. In fused connecting portion 25, a part of synthetic fibers 22C melts and is connected to skin layer 23. With this configuration, synthetic fibers 22C connected to skin layer 23 are included in the vicinity of skin layer 23 in diaphragm 21. Then, synthetic fibers 22C are entangled with synthetic fibers 22C that are not connected to skin layer 23 and natural fibers 22A. Thus, the rigidity of diaphragm 21 is further improved.

In this case, it is preferable that skin layer 23 and synthetic fibers 22C are formed of the same resin 22B. With this configuration, connection strength between synthetic fibers 22C and skin layer 23 is improved in fused connecting portion 25. Therefore, the rigidity of diaphragm 21 is further improved.

Furthermore, skin layer 23 may include natural fibers 22A. With this configuration, the rigidity of diaphragm 21 is further improved. In this case, it is preferable that a gap between natural fibers 22A in skin layer 23 is filled with resin 22B. This configuration can reduce air permeability of diaphragm 21. Consequently, sound distortion occurring due to leakage of air in diaphragm 21 can be reduced. As a result, diaphragm 21 is excellent in the distortion characteristic.

A phase of sound output in a back-surface direction of diaphragm 21 and a phase of sound output in a front-surface direction of diaphragm 21 are opposite to each other. Therefore, the sound output in the back-surface direction of diaphragm 21 and the sound output in the front-surface direction of diaphragm 21 are mixed with each other, so that the sound pressure level of diaphragm 21 is reduced. When diaphragm 21 is provided with skin layer 23, the air permeability of diaphragm 21 is reduced. Thus, mixing of the sound output to the back-surface side and the sound output to the front-surface side of diaphragm 21 can be suppressed. As a result, the sound pressure level of diaphragm 21 can be further improved.

Furthermore, since the surface of skin layer 23 is smooth, the surface of diaphragm 21 has excellent appearance. Furthermore, since skin layer 23 is formed on the surface of diaphragm 21, moisture resistance and water resistance of diaphragm 21 are improved. Consequently, quality and reliability of diaphragm 21 are improved.

As shown in FIG. 1, loudspeaker 11 may be, for example, tweeter 11A. In this case, diaphragm 21 is preferably dome-shaped diaphragm 21A. It is preferable that voice coil 15 is bonded to the back-surface side of dome-shaped diaphragm 21A. In this case, it is preferable that skin layer 23 is disposed so as to face the back-surface direction of tweeter 11A shown in FIG. 3. That is to say, voice coil 15 is bonded to skin layer 23. Note here that voice coil 15 and dome-shaped diaphragm 21A can be bonded to each other with an adhesive.

Since this configuration can suppress adsorption of the adhesive into diaphragm 21, much solid content remains in an adhesive bonding section between voice coil 15 and dome-shaped diaphragm 21A. Therefore, bonding between voice coil 15 and dome-shaped diaphragm 21A is strong. That is to say, since an application amount of the adhesives can be reduced, assembly of diaphragm 21 and voice coil 15 can be made light. As a result, the sound pressure level of diaphragm 21 can be improved. Furthermore, a threshold frequency at high frequencies of diaphragm 21 can be extended.

Note here that skin layer 23 may be formed at the front-surface side of dome-shaped diaphragm 21A. The surface of skin layer 23 is smooth. Therefore, the front side of diaphragm 21 has excellent appearance. Furthermore, moisture the resistance and the water resistance of loudspeaker 11 are improved.

Loudspeaker 11 may be full-range loudspeaker 11B or squawker 11C as shown in FIG. 2. In this case, it is preferable that diaphragm 21 is cone-shaped diaphragm 21B. Note here that in loudspeaker 11, voice coil 15 is bonded to the front-surface side of cone-shaped diaphragm 21B. Therefore, it is preferable that skin layer 23 shown in FIG. 3 is formed on the front-surface side of cone-shaped diaphragm 21B. Note here that diaphragm 21 has a cone shape but may be a dome shape as shown in FIG. 1.

Note here that loudspeaker 11 may be provided with a dust cap on a front surface of cone-shaped diaphragm 21B. Furthermore, cone-shaped diaphragm 21B may include a side cone. Alternatively, diaphragm 21 may be a side cone. The side cone mainly has an influence on reproduction characteristics of sound in high frequencies. Consequently, sound in high frequencies can be faithfully reproduced.

Figure 4A:
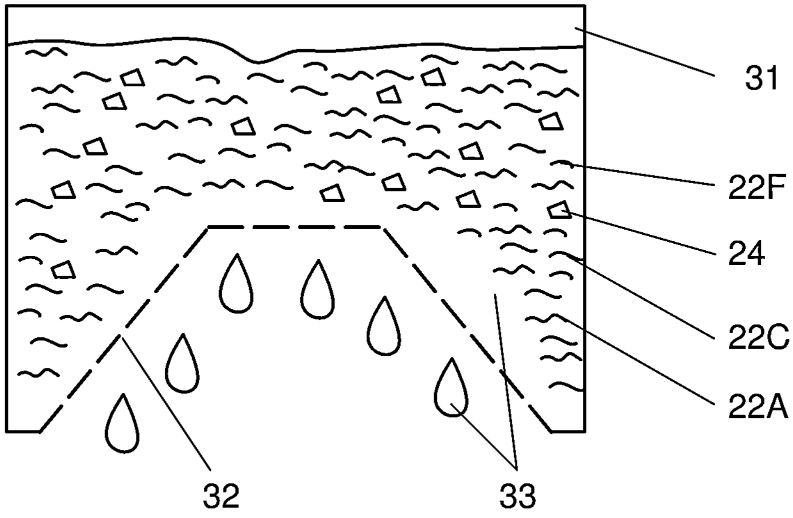
FIG. 4A is a conceptual view of a papermaking step of the diaphragm.
Figure 4B:
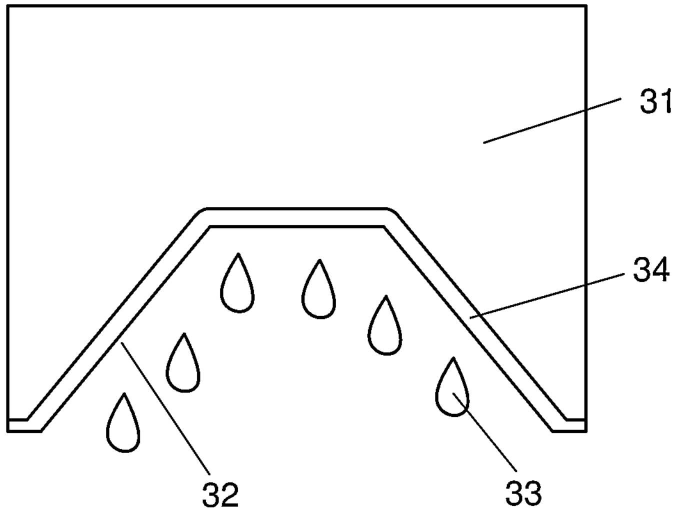
FIG. 4B is a conceptual view of the papermaking step, showing a molded state of a precursor of the diaphragm.

Next, a manufacturing method of diaphragm 21 is described with reference to FIGS. 4A and 4B. FIG. 4A is a conceptual view of a step of producing precursor 34 of diaphragm 21 (hereinafter, referred to as a papermaking step). FIG. 4B is a conceptual view showing a molded state of precursor 34 in the papermaking step. The manufacturing method of diaphragm 21 includes a step of producing precursor 34 of diaphragm 21, and a step of forming diaphragm 21.

The step of producing precursor 34 includes a step of making paper. The step of making paper includes thinly spreading natural fibers 22A and synthetic fibers 22C, which are mixed in water 33 in papermaking tank 31, on papermaking mesh 32. As a result, the mixture of natural fibers 22A and synthetic fibers 22C is deposited on papermaking mesh 32. At this time, water 33 passes through papermaking mesh 32. Consequently, water 33 can be removed from a deposit including the mixture of natural fibers 22A and synthetic fibers 22C. By this operation, precursor 34 of diaphragm 21 including the mixture of natural fibers 22A and synthetic fibers 22C remains on papermaking mesh 32. At this time, it is preferable that pressure below papermaking mesh 32 is reduced.

Note here that when diaphragm 21 includes reinforcement material 24 or micronized bamboo fibers 22F, reinforcement material 24 or micronized bamboo fibers 22F are also mixed with natural fibers 22A and synthetic fibers 22C, and the mixture is subjected to papermaking in the papermaking step.

In diaphragm 21 shown in FIG. 1 or 2, it is preferable that natural fibers 22A and synthetic fibers 22C are oriented randomly. With this configuration, when the shape of diaphragm 21 in a top view is circular, tensile strength in a direction from a center to an outer periphery of diaphragm 21 is substantially equal to tensile strength in a circumferential direction perpendicular to the above-mentioned direction. As a result, the directionality of the strength of diaphragm 21 can be reduced, so that vibration of voice coil 15 is transmitted throughout diaphragm 21 with reduced distortion. Furthermore, distortion of vibration of diaphragm 21 per se can be suppressed. Therefore, diaphragm 21 moves faithfully in linked motion with a movement of voice coil 15. As a result, excellent frequency characteristics of diaphragm 21 are exhibited. That is to say, occurrence of peaks and dips in diaphragm 21 can be suppressed. Furthermore, diaphragm 21 enables sound having little distortion to be reproduced.

Note here that it is preferable that the orientation of natural fibers 22A and synthetic fibers 22C is adjusted (hereinafter, referred to as "orientation is controlled") by adjusting concentrations of natural fibers 22A and synthetic fibers 22C, a water flow in papermaking tank 31, or a dehydrating speed, in the papermaking step.

When diaphragm 21 in which natural fibers 22A and synthetic fibers 22C are oriented randomly is produced, the concentrations of natural fibers 22A and synthetic fibers 22C are preferably low. Furthermore, the water flow in papermaking tank 31 is preferably low. Furthermore, the papermaking speed is preferably slow.

When the concentration of pulp such as natural fibers 22A and synthetic fibers 22C is high, dispersion of the pulp in water tends to be nonuniform. Accordingly, fibers such as natural fibers 22A and synthetic fibers 22C agglomerate, so that poor dispersion occurs in natural fibers 22A and synthetic fibers 22C.

When the water flow is fast or the papermaking speed is high, natural fibers 22A and synthetic fibers 22C are aligned in a water flow direction. Therefore, the water flow is made slow or the papermaking speed is lowered, thereby enabling natural fibers 22A and synthetic fibers 22C to be oriented randomly.

Note here that the random degree of orientation of natural fibers 22A and synthetic fibers 22C can be evaluated by anisotropy of the tensile strength of diaphragm 21. For example, when the shape of diaphragm 21 in a top view is circular, the random degree can be evaluated by a ratio of the tensile strength of diaphragm 21 in the direction from the center to the outer periphery to the tensile strength in the circumferential direction of the tensile strength.

When the orientation is not controlled, the tensile strength in the circumferential direction of the diaphragm is 1.7 times or more as high as the tensile strength in the direction from the center to the outer periphery of the diaphragm. A diaphragm having such a ratio of the tensile strength has difficulty to have a stable piston motion, so that a reproduction frequency band becomes narrow.

Thus, it is preferable that the tensile strength in the circumferential direction of diaphragm 21 is one time or more and 1.5 times or less as high as the tensile strength in the direction from the center to the outer periphery of diaphragm 21. Note here that it is further preferable that the tensile strength in the circumferential direction of diaphragm 21 is one time or more and 1.1 times or less as high as the tensile strength in the direction from the center to the outer periphery of diaphragm 21.

With this configuration, since the anisotropy of the ratio of the tensile strength of diaphragm 21 is reduced, piston motion becomes stable when voice coil 15 vibrates. Therefore, the vibration of voice coil 15 is transmitted throughout diaphragm 21. As a result, the reproduction frequency band of diaphragm 21 can be extended. Furthermore, occurrence of unnecessary resonance or distortion of diaphragm 21 can be suppressed. Note here that a tensile test can be carried out by using a tensile tester according to a test method JISP8113 of Japanese Industrial Standards.

Next, formation of skin layer 23 is described. In the step of forming diaphragm 21, precursor 34 is heated and pressed to form skin layer 23 (hereinafter, referred to as a heating and pressing step). In the heating and pressing step, precursor 34 is molded into a desired shape by sandwiching precursor 34 between a pair of upper and lower molds. Furthermore, in the heating and pressing step, precursor 34 is dried by heating. With this configuration, moisture contained in precursor 34 evaporates, and thus diaphragm 21 can be formed.

Skin layer 23 can be formed by providing a temperature difference between the pair of molds when precursor 34 is pressed. That is to say, during pressing, a temperature of the first surface of precursor 34 is different from that of the second surface opposite to the first surface. For example, the first surface is a front surface of precursor 34 and the second surface is a rear surface of precursor 34. It is preferable that a temperature of a mold having a higher temperature in the temperatures of the two molds is set to be not lower than the temperature at which synthetic fiber 22C is melted. On the other hand, it is preferable that a temperature of the mold having a lower temperature in the temperatures of the two molds is set to be lower than the temperature at which synthetic fiber 22C is melted. With this configuration, on the surface part at a side that is brought into contact with the mold having the higher temperature in precursor 34, synthetic fiber 22C is melted and skin layer 23 can be formed.

For example, when the temperature of the first surface is set to be higher than the temperature of the second surface, synthetic fiber 22C in the vicinity of the first surface of precursor 34 is melted. As a result, skin layer 23 is formed at only the first surface side in diaphragm 21. Furthermore, it is preferable that in the heating and pressing step, synthetic fibers 22C in the vicinity of skin layer 23 are partially melted. With this configuration, fused connecting portion 25 connected to skin layer 23 is formed on synthetic fiber 22C.

Note here that the mold having a higher temperature in temperatures of the pair of molds may be heated. With this configuration, since only one mold may be provided, a structure of the mold is simple. Therefore, increase in cost of the mold can be suppressed. Furthermore, power consumption for heating can be reduced.

Since skin layer 23 can be produced by the above-mentioned manufacturing method, additional operations, for example, preparing a sheet as skin layer 23 and attaching it to paper layer 22 are not necessary. Therefore, productivity of diaphragm 21 is excellent.

Figure 5:
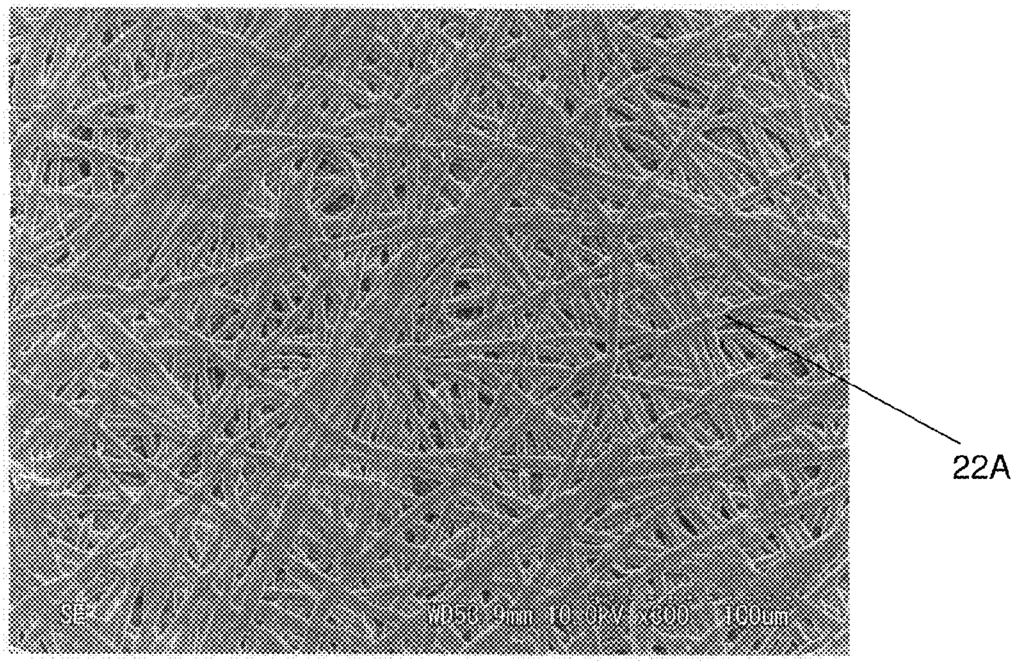
FIG. 5 is an SEM observation view seen from a front side of the diaphragm.
Figure 6:
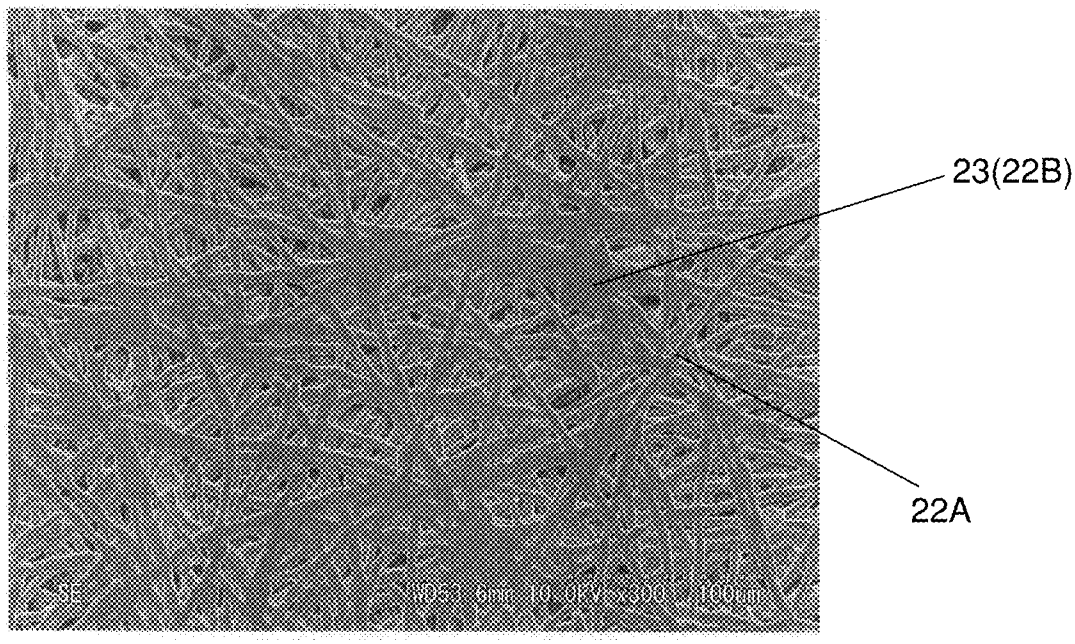
FIG. 6 is an SEM observation view seen from a rear side of the diaphragm.
Figure 7:
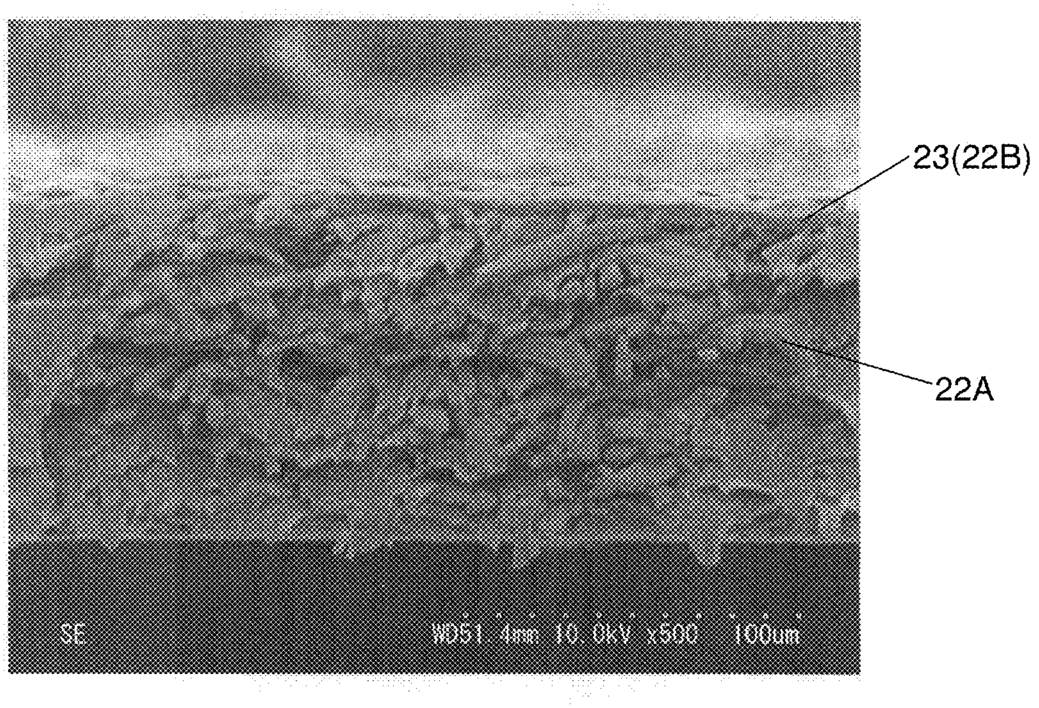
FIG. 7 is an SEM observation view of a cross section of the diaphragm.

States of a surface or a cross-section of diaphragm 21 produced by using the above-mentioned manufacturing method are described with reference to FIGS. 5 to 7. FIG. 5 is an SEM observation view seen from the front side of diaphragm 21. FIG. 6 is the SEM observation view seen from a rear side of diaphragm 21. FIG. 7 is an SEM observation view of a cross section of diaphragm 21. From these observation views, on the front side of diaphragm 21, it can be found that natural fiber 22A is exposed. On the other hand, it can be found that skin layer 23 is formed on the front side of diaphragm 21. That is to say, it can be found that skin layer 23 is formed only on the rear side of diaphragm 21. Note here that in skin layer 23, the front of natural fiber 22A is covered with resin 22B. Furthermore, skin layer 23 includes a large number of sections in which of natural fibers 22A are bridged to each other by resin 22B. Furthermore, skin layer 23 also has sections in which natural fibers 22A are filled with resin 22B.

A loudspeaker of a comparative example (hereinafter, referred to as sample B) and loudspeaker 11 using diaphragm 21 produced by the above-mentioned manufacturing method (hereinafter, referred to as sample A) are produced. Sample A is produced by controlling the orientation in the papermaking step. Furthermore, in sample A, skin layer 23 is formed by providing a temperature difference between a pair of molds in the heating and pressing step. On the other hand, in sample B, the orientation is not controlled in the papermaking step. Furthermore, the pair of molds have a lower temperature than a melting point of synthetic fiber 22C shown in FIG. 3, and do not have a temperature difference between the temperatures of the pair of molds. That is to say, on the surface of the sample B, skin layer 23 is not formed. Note here that both sample A and sample B include natural fibers 22A and synthetic fibers 22C shown in FIG. 3 at a mixing ratio of 15:85.

Figure 8A:
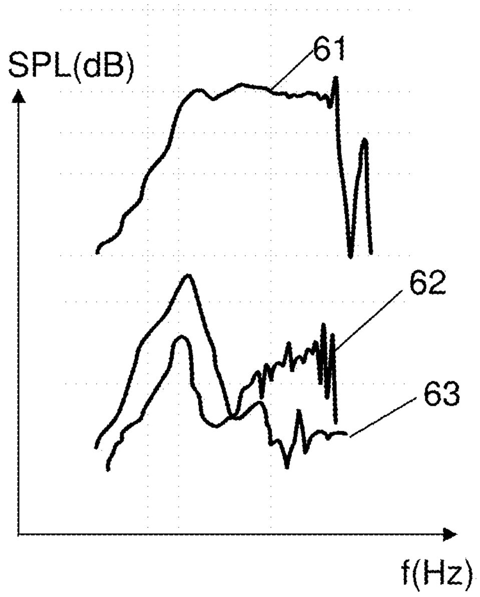
FIG. 8A is a graph showing frequency characteristics of a loudspeaker using the diaphragm of the exemplary embodiment of the present invention.
Figure 8B:
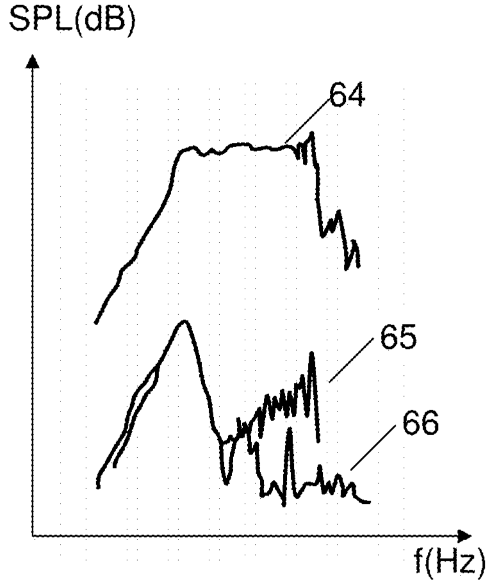
FIG. 8B is a graph showing frequency characteristics of a loudspeaker of a comparative example.

Next, frequency characteristics of samples A and B are described with reference to drawings FIGS. 8A and 8B. FIG. 8A is a graph showing frequency characteristics of sample A. FIG. 8B is a graph showing frequency characteristics of sample B. In FIGS. 8A and 8B, the abscissa shows the frequency and the ordinate shows values of the sound pressure level. Characteristic curve 61 shows a sound pressure-frequency characteristic of sample A. Characteristic curve 62 shows a secondary distortion characteristic of sample A. Characteristic curve 63 shows a tertiary distortion characteristic of sample A. On the other hand, characteristic curve 64 shows a sound pressure-frequency characteristic of sample B. Characteristic curve 65 shows a secondary distortion characteristic of sample B. Characteristic curve 66 shows a tertiary distortion characteristic of sample B.

When characteristic curve 61 and characteristic curve 64 are compared with each other, the threshold frequency at high frequencies is higher in sample A as compared with sample B. The threshold frequency at high frequencies of sample A is improved to about 20 KHz to 27 KHz. Furthermore, when characteristic curve 63 and characteristic curve 66 are compared with each other, the tertiary distortion of sample A is remarkably improved in the range from 1 kHz to 5 kHz as compared with sample B.

Figure 9:
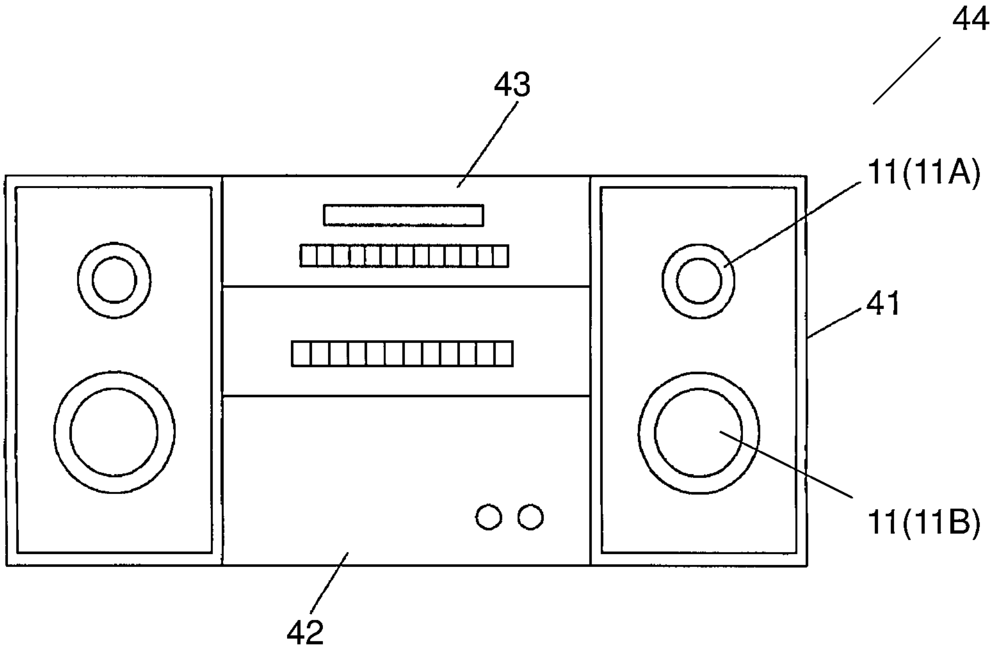
FIG. 9 an outline view of an electronic device of the exemplary embodiment of the present invention.

Hereinafter, the electronic device of this exemplary embodiment is described with reference to FIG. 9. FIG. 9 is a conceptual view of an electronic device of this exemplary embodiment. Electronic device 44 includes loudspeaker 11, case 41, and amplifier 42. Note here that it is preferable that loudspeaker 11 includes, for example, tweeter 11A and full-range loudspeaker 11B. Furthermore, electronic device 44 may include player 43. Note here that player 43 outputs an electric signal to be input into amplifier 42.

Loudspeaker 11, amplifier 42, and player 43 are housed in case 41. Amplifier 42 amplifies an electric signal and supplies the signal to loudspeaker 11.

Electronic device 44 is, for example, an audio mini component system. Note here that electronic device 44 is not limited to the audio mini component system, and may be video devices such as a liquid crystal display television and a plasma display television, as well as information devices such as a portable telephone and computer.

With the above-mentioned configuration, the sound pressure level of sound output from electronic device 44 can be increased. Furthermore, electronic device 44 has a high threshold frequency at high frequencies, so that it can reproduce high sound clearly. Therefore, the sound quality of sound reproduced by electronic device 44 is improved. Furthermore, the quality and reliability of electronic device 44 are high. Furthermore, a price of electronic device 44 is low.

Figure 10:
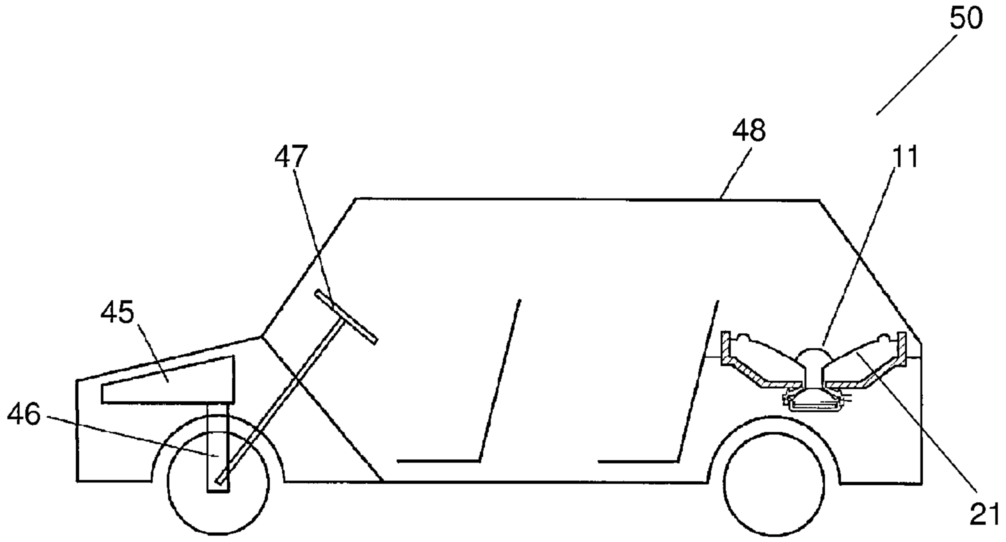
FIG. 10 is a conceptual view of a mobile device of the exemplary embodiment of the present invention.

Hereinafter, a mobile device in accordance with this exemplary embodiment is described with reference to FIG. 10. FIG. 10 is a conceptual view of mobile device 50. Mobile device 50 includes body 48, driver 45, and loudspeaker 11. Note here that driver 45 may include power transmission unit 46, and steering portion 47. Furthermore, steering portion 47 may include a tire.

Driver 45 and loudspeaker 11 are housed in body 48. Driver 45 generates power for moving mobile device 50. Driver 45 includes, for example, an engine or a motor. Power transmission unit 46 transmits the power to tires. Power transmission unit 46 may include, for example, a gear mechanism, or the like. Steering portion 47 may include, for example, a steering wheel and an accelerator pedal.

Loudspeaker 11 can be disposed to, for example, a rear tray. Loudspeaker 11 can constitute a part of a car navigation system and an audio system. Note here that loudspeaker 11 is not necessarily disposed to a rear tray, but may be disposed to a front panel, a door, a ceiling, a pillar portion, an instrument panel portion, a floor, or the like.

Diaphragm 21 is lighter than a diaphragm made of resin. Therefore, since magnet 14A for driving diaphragm 21 can be downsized, yoke 14B and plate 14C can be also downsized. As a result, since loudspeaker 11 can be made light and mobile device 50 can also be made light, it can contribute to improvement of fuel consumption of mobile device 50, and also contribute to suppression of consumption of fossil fuel.

Mobile device 50 is, for example, an automobile. Note here that mobile device 50 is not limited to an automobile, and may be a motorcycle, a bus, a train, a ship, an aircraft, and the like.

INDUSTRIAL APPLICABILITY

A diaphragm in accordance with the present invention has an advantage of being light and having high rigidity, and can be applied to a loudspeaker to be used for an electronic device, a mobile device, or the like.

REFERENCE MARKS IN THE DRAWINGS

11: loudspeaker
11A: tweeter
11B: full-range loudspeaker

11C: squawker
12: frame
13: magnetic gap
14: magnetic circuit
14A: magnet
14B: yoke
14C: plate
14D: magnet
14E: yoke
14F: plate
14G: center pole
15: voice coil
21: diaphragm
21A: dome-shaped diaphragm
21B: cone-shaped diaphragm
22: paper layer
22A: natural fiber
22B: resin
22C: synthetic fiber
22E: bamboo fiber
22F: micronized bamboo fiber
23: skin layer
24: reinforcement material
25: fused connecting portion
31: papermaking tank
32: papermaking mesh
33: water
34: precursor
41: case
42: amplifier
43: player
44: electronic device
45: driver
46: power transmission unit
47: steering portion
48: body
50: mobile device
61: characteristic curve
62: characteristic curve
63: characteristic curve
64: characteristic curve
65: characteristic curve
66: characteristic curve

The invention claimed is:

1. A diaphragm comprising:

a paper layer including natural fibers and synthetic fibers formed of thermoplastic resin; and a skin layer formed of a same thermoplastic resin as the thermoplastic resin of the synthetic fibers and formed on one surface of the paper layer, wherein tensile strength in a circumferential direction of the diaphragm is more than one time and 1.5 times or less as high as tensile strength in a direction from a center to an outer periphery of the diaphragm, the natural fibers have a beating degree of 200 ml or more and 700 ml or less in Canadian Standard freeness, and a length of each of the natural fibers is 0.8 mm or more and less than 3 mm.

2. The diaphragm of claim 1, wherein a part of the synthetic fibers includes a fused connecting portion unitarily connected to the skin layer.

3. The diaphragm of claim 1, wherein the skin layer is a melt of the synthetic fibers.

4. The diaphragm of claim 1, wherein orientation directions of the natural fibers and the synthetic fibers are random.

5. The diaphragm of claim 1, wherein a content of the natural fibers is 1% by weight or more and 90% by weight or less with respect to a total weight of the diaphragm.

6. The diaphragm of claim 1, wherein a density of the diaphragm is 0.25 g/cm3 or more and 1.00 g/cm3 or less.

7. The diaphragm of claim 1, wherein the natural fibers include a bamboo fiber.

8. The diaphragm of claim 7, wherein the bamboo fiber includes 0% by weight or more and 20% by weight or less of lignin with respect to a total weight of the bamboo fiber.

9. The diaphragm of claim 7, wherein the natural fibers further include 1% by weight or more and 30% by weight or less of micronized bamboo fibers with respect to the total weight of the bamboo fiber.

10. The diaphragm of claim 9, wherein a length of each of the micronized bamboo fibers is 0.1 mm or more and less than 0.8 mm.

11. The diaphragm of claim 9, wherein the micronized bamboo fibers have a beating degree of 1 ml or more and 200 ml or less in Canadian Standard freeness.

12. The diaphragm of claim 1, wherein the paper layer further includes reinforcement material.

13. The diaphragm of claim 12, wherein the reinforcement material is one or more selected from the group consisting of aramid fibers, glass fibers, carbon fibers, calcium carbonate, diatomaceous earth, talc, aluminum hydroxide, and a carbonized natural fiber.

14. The diaphragm of claim 1, wherein the resin is acrylic resin, polyester resin, or polyolefin resin.

15. The diaphragm of claim 14, wherein the polyester resin is one selected from the group consisting of polyethylene terephthalate, polyethylene naphthalate, and polylactic acid.

16. A loudspeaker comprising:

a frame;

a magnetic circuit bonded to the frame and provided with a magnetic gap;

a voice coil inserted into the magnetic gap; and a diaphragm bonded to a periphery of the frame and including:

a paper layer including natural fibers and synthetic fibers formed of thermoplastic resin, and a skin layer formed of a same thermoplastic resin as the thermoplastic resin of the synthetic fibers and formed on one surface of the paper layer, wherein tensile strength in a circumferential direction of the diaphragm is more than one time and 1.5 times or less as high as tensile strength in a direction from a center to an outer periphery of the diaphragm, the natural fibers have a beating degree of 200 ml or more and 700 ml or less in Canadian Standard freeness, and a length of each of the natural fibers is 0.8 mm or more and less than 3 mm.

17. The loudspeaker of claim 16, wherein the skin layer is formed in the diaphragm at a surface to which the voice coil is bonded.

18. The loudspeaker of claim 16, wherein the skin layer is formed in the diaphragm at a surface opposite to the surface to which the voice coil is bonded.

19. An electronic device comprising:

the loudspeaker defined in claim 16; and an amplifier electrically connected to the loudspeaker.

20. A mobile device comprising:

a body;

a driver mounted to the body; and the loudspeaker defined in claim 16 and mounted to the body.

* * * * *